United States Patent [19]

Gimvang

[11] Patent Number: 5,560,773
[45] Date of Patent: Oct. 1, 1996

[54] PENETRATING SEALANT COMPOSITION

[75] Inventor: Bo H. Gimvang, St. Augustine, Fla.

[73] Assignee: FMC Corporation, Philadelphia, Pa.

[21] Appl. No.: 489,740

[22] Filed: Jun. 13, 1995

[51] Int. Cl.⁶ ..................................................... C09D 1/04
[52] U.S. Cl. ...................... 106/634; 106/637; 106/14.11; 106/14.15; 106/14.21; 106/14.41; 106/14.42; 106/14.43; 106/14.44
[58] Field of Search ..................................... 106/603, 633, 106/634, 637, 900, 14.11, 14.15, 14.21, 14.42, 14.43, 14.44, 4.41

[56] References Cited

U.S. PATENT DOCUMENTS

| | | | |
|---|---|---|---|
| 2,951,770 | 9/1960 | Lodge et al. | 106/634 |
| 3,093,493 | 6/1963 | von Freyhold | 106/634 |
| 3,661,602 | 5/1972 | Gerow | 106/603 |
| 3,933,514 | 1/1976 | Banks et al. | 106/603 |
| 4,354,874 | 10/1982 | Vickers | 106/900 |
| 5,242,494 | 9/1993 | Callaghan et al. | 106/603 |
| 5,366,767 | 11/1994 | Howard | 106/634 |

*Primary Examiner*—Mark L. Bell
*Assistant Examiner*—Michael Marcheschi
*Attorney, Agent, or Firm*—Charles C. Fellows

[57] ABSTRACT

A penetrating sealant for use with cured silica-containing materials such as cement or concrete, the composition comprising a mixture of an alkali metal silicate, preferably lithium silicate, a cationic fluorinated surfactant, a non-ionic surfactant and water.

4 Claims, No Drawings

PENETRATING SEALANT COMPOSITION

BACKGROUND OF THE INVENTION

The invention relates in general to sealant compositions applied to cured silica-containing materials, such as cement or concrete, to improve resistance to degradation caused by weather, chemicals and other corrosive elements. More particularly, the invention relates to sealants which penetrate to significant depth into the cured silica-containing material substrate and prevent alkali-silica reactivity within the substrate. Even more particularly, the invention relates to a sealant composition containing an alkali metal silicate and one or more surfactants.

Silica-containing materials such as cement or concrete are extremely common and are usually used in an environment exposed to corrosive, chemical, mechanical, thermal or atmospheric degrading elements. For example, rain water and road salt used to deice roads will penetrate the surface of the concrete and react with unreacted calcium compounds in the concrete to create a gel which expands and causes stresses and cracking, eventually degrading the concrete to the point where expensive repair or replacement is required. In most situations therefore it has been found beneficial to provide a protective coating or sealant to the surface of the silica-containing substrate to form a barrier layer to protect the substrate from the environmental hazards. Such coatings or sealants are preferably wear, chemical, water and ultraviolet light resistant, and must be of relatively low viscosity when applied to a cured substrate for optimal adhesion and penetration. Typical known coatings and sealants include components such as epoxies, polyurethanes, silicones, silicates, acrylics, vinyls, alkyds, or chlorinated rubbers. Many of the currently known sealants and coatings are hazardous to mix, have relatively high viscosities and are not highly effective for post-cure applications, mainly due to the inability of the sealant to penetrate to any significant depth below the surface of the cured and hardened silica-containing material.

It is an object of this invention to provide a sealant for post-cure application to silica-containing materials, such cement, concrete, stucco, masonry, plaster, limestone, etc., which increases the useful life of the material by protecting the substrate from environmental degradation caused by wear, chemicals, water, ultraviolet light, etc. It is a further object to provide such a sealant with greatly improved penetration properties relative to the currently known sealants. It is a still further object to provide such a sealant containing alkali metal silicates and a surfactant, whereby the surfactant maximizes penetration of the sealant into the substrate and the alkali metal silicates react with calcium compounds in the silica-containing material to form insoluble silicate structures to prevent environmental degradation over time from alkali-silicate reactions.

SUMMARY OF THE INVENTION

The invention is a composition for a penetrating sealant for application to cured silica-containing materials, such as for example hardened cement or concrete, the sealant composition comprising a mixture of an alkali metal silicate, such as sodium, potassium or lithium silicate, one or more surfactants and water. Preferably, the sealant comprises a mixture of two surfactants, one a cationic fluorinated surfactant and the other a non-ionic surfactant, and the alkali metal silicate is preferably lithium silicate. In addition, the preferred mixture further comprises small amounts of one or both of a cure time extender and sodium methyl siliconate component. The sealant mixture comprises approximately 45 to 90 wt. percent water, approximately 10 to 50 wt. percent alkali metal silicate, and approximately 0.01 to 5 wt. percent surfactant, with the surfactant component preferably comprising approximately 0.01 to 1.8 wt. percent of a cationic fluorinated surfactant and approximately 0.05 to 3.2 wt. percent of a non-ionic surfactant.

DETAILED DESCRIPTION OF THE INVENTION

The invention will now be disclosed with regard for the preferred embodiment and best mode of practicing the invention. In general, the invention is a penetrating sealant for application to cured silica-containing materials, such as for example cement, concrete, stucco, masonry, plaster, limestone or the like, which can be applied as a solution by ponding, brushing or spraying the sealant composition onto the surface of the hardened substrate material. The sealant composition maximizes penetration into the interior of the silica-containing material and significantly improves the resistance of the material to wear, corrosion, environmental and chemical degradation. The sealant composition generally comprises an alkali metal silicate plus surfactant in solution.

The sealant composition comprises an alkali metal silicate in a range of approximately 10 to 50 wt. percent, a surfactant in a range of approximately 0.01 to 5 wt. percent and water in a range of approximately 45 to 90 wt. percent. The alkali metal silicate can be taken from the family containing lithium silicate ($Li_2O$-$SiO_2$), sodium silicate ($Na_2O$-$SiO_2$) or potassium silicate ($K_2O$-$SiO_2$). The alkali metal silicate, upon absorption into the interior of the silica-containing substrate, reacts with calcium compounds in the substrate to form insoluble silicate structures which strengthens the silica-containing material. The alkali metal silicate also reacts with calcium hydroxide, which lines the microscopic capillary channels in the substrate to form insoluble complex tricalcium silicate compounds. These tricalcium silicate compounds block the capillaries and pores and eliminate moisture absorption into the substrate.

It is preferred that lithium silicate be the alkali metal silicate component, due to its lower alkalinity in comparison to sodium and potassium silicate, and also due to its smaller size, which provides for a lower viscosity solution and therefore increased penetration into the substrate. Lithium silicate additionally provides wider particle distribution during absorption relative to either sodium or potassium silicate, such that the lithium silicate is spread evenly through the penetration depth rather being concentrated either on the surface or at the maximum depth of penetration. This maximizes the reactivity of the lithium compounds with the calcium compounds, resulting in fewer unreacted calcium compounds remaining after the treatment. The unreacted calcium compounds found in normal silica-containing materials form expanding silica gel compounds when exposed to water. The expanding silica gels, known as alkali-silica reactions, cause stress and micro-cracking within the silica-containing material which deteriorates the material over time. By minimizing the number of unreacted calcium compounds in the surface layer of the silica-containing material, less degradation from environmental agents will occur and the material will have a much longer suitable use life. Suitable lithium silicate formulations are sold under the brand name Inobond LI-2043 available from Van Baerle & CIE or Lithsil-4 from FMC Corp.

Since the alkali metal silicates react with calcium compounds in the substrate, it is necessary to increase the depth of penetration and penetration rates in order to allow the lithium silicate compound time to infuse below the surface. This is accomplished by providing up to 5 wt. percent of a surfactant to lower the surface tension of the mixture. Preferably, a combination of two surfactants is used, one a cationic fluorinated surfactant to lower the surface tension of the water and the other a non-ionic surfactant to lower the surface tension of the alkali metal compound. The cationic fluorinated surfactant is preferably present in a range of approximately 0.01 to 1.8 wt. percent and has a general structure of $R_fSO_2NHC_3H_6N^+(CH_3)_3I^-$ where $R_f=C_nF_{2n+1}(n\sim 8)$, such as for example a composition sold by 3M under the brand name FC135 ™. The non-ionic surfactant is preferably present in a range of approximately 0.05 to 3.2 wt. percent and has a general structure of $R\text{-}C_6H_3(CH_2CH_2O)_nH$, where R is a butyl, pentyl, hexyl, heptyl, octyl, nonyl or decyl compound having a molecular weight between 1000 to 3000, with n=25–50, such as for example an alkyphenol ethoxylate such as sold by Rhone-Poulenc under the brand names Igepal™ or Alkasurf™.

In addition to the above components, the preferred formulation for the sealant composition further comprises a cure time extender or retarder in the preferred range of from approximately 0.05 to 1.05 wt. percent, such as for example a potassium dichromate ($K_2Cr_2O_7$). This component slows the reaction rate between the alkali metal silicate and the calcium compounds in the silica-containing substrate, which further enhances penetration of the alkali metal silicate into the depth of the material. Another non-essential but preferred additive to the above composition is sodium methyl siliconate, such as for example sold under the brand name Dowfax 772 by Dow Corning, in the range of approximately 0.5 to 2.0 wt. percent. This additive improves water repellency on the surface of the material.

The preferred method for mixing the components is to create a first pre-mix of the alkali metal silicate and cationic fluorinated surfactant, and a create a second pre-mix of the water and non-ionic surfactant. The first and second pre-mixes are then mixed to form the final product, with the additional components, if any, added at this juncture. The mixed composition has a suitably long shelf-life, as no reactions occur until application to the silica-containing compound.

The preferred sealant composition exclusive of additional additives comprises approximately 60 to 65 wt. percent water, approximately 30 to 35 wt. percent lithium silicate, approximately 0.4 to 0.6 wt. percent cationic fluorinated surfactant, and approximately 1.8 to 2.2 wt. percent non-ionic surfactant. The most preferred embodiment of the composition also comprises the cure time extender and the sodium methyl siliconate components.

In a test to determine penetration depth of the sealant composition, sample concrete blocks were treated with a number of known sealants and the sealant of the invention. Chlorine penetration was then measured for two depth ranges—up to ½ inch and from ½ to 1 inch. The chlorine was applied by pooling a 3% solution on the surface of the various substrates for a period of 90 days. The results are shown in the following table, with the penetration of the chlorine into the substrates expressed as a percentage relative to the control sealant (linseed oil):

| SEALANT TYPE | DEPTH - UP TO ½ INCH | DEPTH - ½ TO 1 INCH |
|---|---|---|
| linseed oil (control) | 100% | 100% |
| mineral gum | 198% | 518% |
| silicone | 152% | 151% |
| epoxy | 110% | 180% |
| polymer resin | 104% | 45% |
| organo-silane | 105% | 128% |
| alkali metal silicate (invention) | 45% | 20% |

As shown, application of the alkali metal silicate in the composition at hand significantly reduced chlorine penetration into the substrate material, both near the surface and at a depth of up to one inch. Additional tests showed that a concrete substrate treated with the inventive composition show a 64% reduction in water absorption capacity at the surface and a 44% reduction after abrading off the top 1/16 inches of the surface.

It is contemplated that obvious substitutions or equivalents may be apparent to those skilled in the art, and the above examples are by way of reference only. The true scope and definition of the invention therefore is to be as set forth in the following claims.

I claim:

1. A penetrating sealant compositon consisting essentially of;

a) 10–50 weight percent of an alkali metal silicate selected from the group consisting of lithium silicate, sodium silicate and potassium silicate;

b) 45–90 weight percent water;

c) 0.06–5 weight percent of a surfactant mixture which consists of 0.01–1.8 weight percent of a cationic fluorinated surfactant and 0.05–3.2 weight percent of a non-ionic surfactant;

d) 0.5 to 2.0 weight percent of sodium methyl siliconate, and e) 0.05 to 1.05 weight percent potassium dichromate.

2. The composition of claim 1, where said alkali metal silicate is lithium silicate.

3. The composition of claim 1, wherein the non-ionic surfactant is of the formula $R\text{-}C_6H_3(CH_2CH_2O)_nH$, wherein R is selected from butyl, pentyl, hexyl, heptyl, octyl, nonyl and decyl groups, n=25 to 50, and the non-ionic surfactant has a molecular weight between 1000 and 3000.

4. The composition of claim 1 wherein the cationic fluorinated surfactant is of the formula $R_fSO_2NHC_3H_6N^+(CH_3)_3I^-$ where $R_c=C_nF_{2n+1}$ and $n\approx 8$.

* * * * *